(12) United States Patent
Sugihara et al.

(10) Patent No.: US 9,698,662 B2
(45) Date of Patent: Jul. 4, 2017

(54) POWER-GENERATING MODULE

(75) Inventors: Masaki Sugihara, Okayama (JP); Kazuyuki Tsukimori, Okayama (JP); Makoto Wada, Okayama (JP); Kenshi Nagata, Kurayoshi (JP)

(73) Assignee: OMRON Corporation, Kyoto (JP)

( * ) Notice: Subject to any disclaimer, the term of this patent is extended or adjusted under 35 U.S.C. 154(b) by 605 days.

(21) Appl. No.: 14/360,202

(22) PCT Filed: Mar. 15, 2012

(86) PCT No.: PCT/JP2012/056659
§ 371 (c)(1),
(2), (4) Date: Jul. 2, 2014

(87) PCT Pub. No.: WO2013/088754
PCT Pub. Date: Jun. 20, 2013

(65) Prior Publication Data
US 2014/0306554 A1   Oct. 16, 2014

(30) Foreign Application Priority Data

Dec. 12, 2011   (JP) .................................. 2011-271446

(51) Int. Cl.
*H02K 41/02* (2006.01)
*H02K 35/00* (2006.01)
*H02K 7/18* (2006.01)

(52) U.S. Cl.
CPC ............ *H02K 35/00* (2013.01); *H02K 7/1876* (2013.01)

(58) Field of Classification Search
CPC ...... H02K 35/00; H02K 35/02; H02K 7/1869; H02K 7/1876; H02K 41/02; H01H 2239/076; H01H 47/22
(Continued)

(56) References Cited

U.S. PATENT DOCUMENTS 9,324,523 B2 *   4/2016   Matsumoto .......... H02K 7/1853
2003/0029708 A1   2/2003   Yu et al.
(Continued)

FOREIGN PATENT DOCUMENTS

JP   2003-108287 A   4/2003
JP   2003-164136 A   6/2003
(Continued)

OTHER PUBLICATIONS

Extended European Search Report issued in corresponding European Application No. 12858069.3, mailed on Oct. 29, 2015 (7 pages).
(Continued)

*Primary Examiner* — Dang Le
*Assistant Examiner* — Leda Pham
(74) *Attorney, Agent, or Firm* — Osha Liang LLP (57) ABSTRACT

A power-generating module has a base, a power-generating unit that is placed in the base, a plunger that is placed in the base and that vertically reciprocates, and a drive section that interlocks with the reciprocation of the plunger and starts up the power-generating unit. The drive section is biased to a boost-up position where the plunger is boosted up. The drive section has at least two links that turn between the boost-up position and a press-in position where the power-generating unit is started up. Both ends of one of the links are turnably supported by the base. Both ends of another link are turnably supported by the plunger. The links turn in an interlocking manner by coupling to each other.

9 Claims, 12 Drawing Sheets

(58) Field of Classification Search
USPC .......... 310/12.01, 12.12, 12.27, 14; 335/205
See application file for complete search history.

(56) References Cited

U.S. PATENT DOCUMENTS

2013/0270092 A1* 10/2013 Kaneko ................ H02K 7/1853
200/501
2014/0285296 A1* 9/2014 Nagahara .............. H01F 7/0231
335/302

FOREIGN PATENT DOCUMENTS

| JP | 2010-130757 A | 6/2010 |
| JP | 2010-283970 A | 12/2010 |

OTHER PUBLICATIONS

International Search Report issued in PCT/JP2012/056659 mailed on Jun. 12, 2012 (4 pages).

* cited by examiner

POWER-GENERATING MODULE

BACKGROUND

Technical Field

The present invention relates to a power-generating module, particularly to a power-generating module used for a transmission unit that transmits a signal to a reception unit.

Related Art

Conventionally, a power-generating unit incorporated as a power-generating module is driven to generate a power by electromagnetic induction, and a signal is transmitted to a reception unit from a circuit of the power-generating module.

As to the power-generating module having the above configuration, for example, Patent Document 1 discloses a wireless switch in which a push button is operated to drive a high-frequency communication device for signal transmission with the power generated by an incorporated power-generating device.

Patent Document

Patent Document 1: Japanese Unexamined Patent Publication No. 2010-283970

However, in the wireless switch, the power-generating section is driven by a pressing force of a push button through a rack arm engaging with the center of a rear surface of the push button. Therefore, for example, when the center of the push button is pressed, the pressing force is transmitted to the power-generating section without any waste. On the other hand, when an end portion of the push button is pressed, a large pressing force is required to drive the power-generating section. Therefore, unfortunately a variation in touch-operation feeling is generated to degrade operability and reliability. Additionally, unfortunately a driving mechanism of the power-generating section is complicated to increase production cost.

SUMMARY

One or more embodiments of the present invention provides a power-generating module in which the production cost can be reduced with the simple configuration while the variation in touch-operation feeling is eliminated to improve the operability and the reliability.

A power-generating module according to one or more embodiments of the present invention includes a base, a power-generating unit, a plunger, and a drive section. The power-generating unit is placed in the base, the plunger is placed in the base and is configured to vertically reciprocate, and the drive section is configured to interlock with the reciprocation of the plunger and start up the power-generating unit. In the power-generating module, the drive section is biased to a boost-up position where the plunger is boosted up. The drive section includes at least two links configured to turn between the boost-up position and a press-in position where the power-generating unit is started up. Both ends of one of the links are turnably supported by the base, and both ends of another link are turnably supported by the plunger. The links are configured to turn in an interlocking manner by coupling to each other.

According to the above configuration, a pressing force acting on the plunger is transmitted to the power-generating unit through at least the two links to drive the power-generating unit. Accordingly, the configuration of the power-generating module can be simplified to reduce the production cost. Because the links turns while interlocking with each other, when one of the links is pressed in, the other link is also pressed in. Therefore, the variation in touch-operation feeling can be eliminated to improve the operability and the reliability.

The drive section may turnably be supported by the plunger.

Therefore, any portion of the plunger may be pressed to cause the pressing force to be transmitted to the power-generating unit through the drive section, to improve the operability.

The drive section may be biased to the boost-up position by an elastic body. An operating portion configured to start up the power-generating unit may be provided in an arm having an intersection at a fitting portion configured to couple the links to each other.

When the operating portion is provided in the arm, the power-generating unit can securely be started up by displacement of the first and second links interlocking with the plunger.

The operating portion may be provided in coaxial with or near the fitting portion.

Therefore, with the movement of the fitting portion, the operating portion can securely move to start up the power-generating unit.

The links may include a first link and a second link. Each of the first link and the second link may include a pair of arms, a turning shaft, and a movable part. The turning shaft is configured to couple ends of the arms to each other. The movable part is configured to couple other ends of the arms to each other and turn about the turning shaft. The arms of the first link may fit in and intersect the respective arms of the second link in centers of the arms.

The strength of the first and second links can be ensured when the ends of the arms are coupled to each other by the turning shaft and the movable part.

The links may include a first link and a second link. The first link may include a pair of arms, a turning shaft provided at ends of the arms, and a movable part configured to couple other ends of the arms to each other and turn about the turning shaft. The second link may include a pair of arms, a turning shaft configured to couple ends of the arms to each other, and a movable part that is provided at other ends of the arms and is configured to turn about the turning shaft. The arms of the first link may fit in and intersect the respective arms of the second link in centers of the arms.

Therefore, the number of components constituting the first and second links can be decreased to reduce the production cost.

An electronic device according to one or more embodiments of the present invention is made such that a wireless transmission unit is started up by a power generated by the power-generating module. A signal transmitted from the wireless transmission unit is received by a wireless reception unit to sense press of a pressing part provided in the plunger.

The use of the power-generating module in the electronic device can simplify the configuration and reduce the production cost. Additionally, the variation in touch-operation feeling can be eliminated to improve the operability and the reliability.

A pulse generator may be started up by a power generated by the power-generating module. Press of a pressing part provided in the plunger may be sensed by reception of a signal transmitted from the pulse generator, the reception by an input section configured to input the signal to an external device.

Press of a pressing part provided in the plunger may be sensed by reception of a signal transmitted from the power-generating module, the reception by an input section configured to input the signal to an external device.

DETAILED DESCRIPTION

Power-generating module according to embodiments of the present invention will be described with reference to FIGS. 1 to 12. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
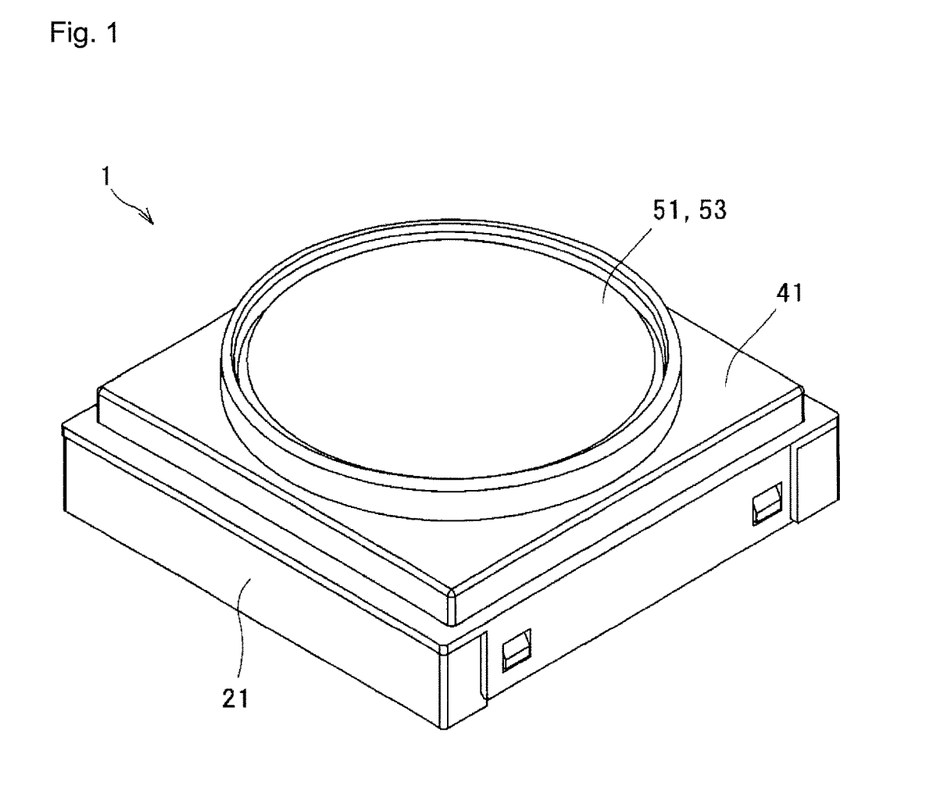
FIG. 1 is a perspective view illustrating a power-generating module according to a first embodiment of the present invention.
Figure 2:
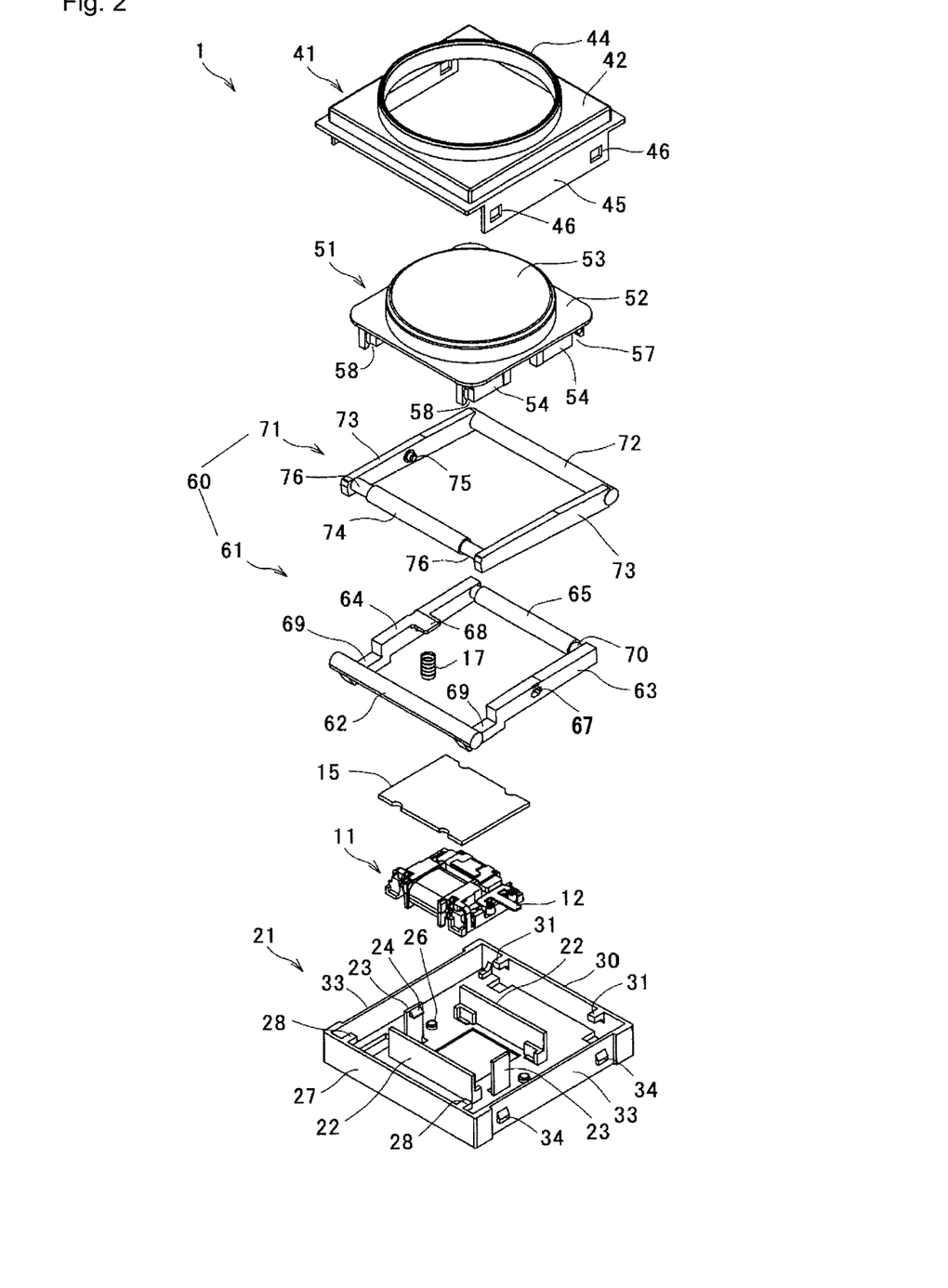
FIG. 2 is an exploded perspective view of the power-generating module in FIG. 1.

As illustrated in FIGS. 1 and 2, power-generating module 1 of a first embodiment includes power-generating unit 11, base 21, cover 41, plunger 51, and drive section 60. Plunger 51 is arranged while being vertically movable, and drive section 60 drives power-generating unit 11 according to movement of the plunger 51.

Power-generating unit 11 includes start-up tongue piece 12 projecting outward. When start-up tongue piece 12 is pressed downward, an iron core (not illustrated) provided inside turns in a seesaw manner to generate a start-up power by electromagnetic induction.

Figure 3A:
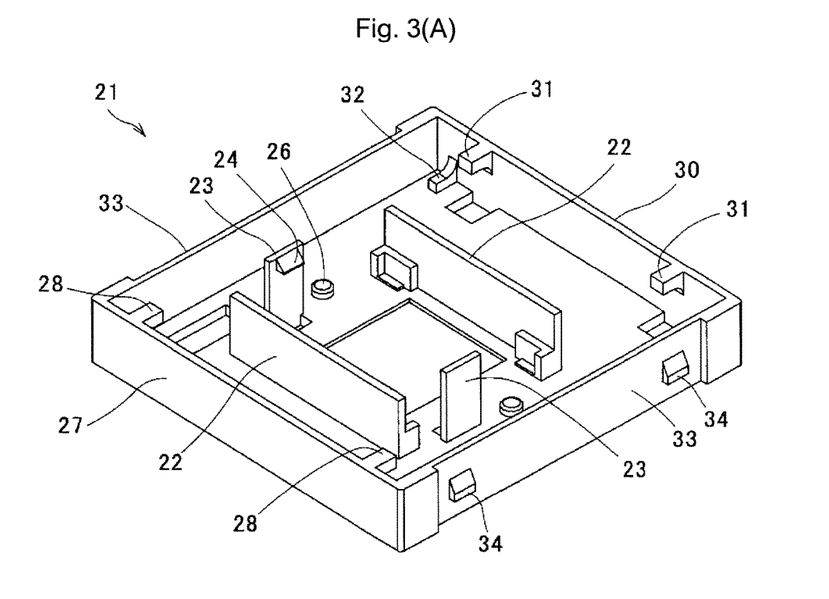
FIG. 3(A) is a perspective view illustrating a base of the power-generating module in FIG. 2.
Figure 3B:
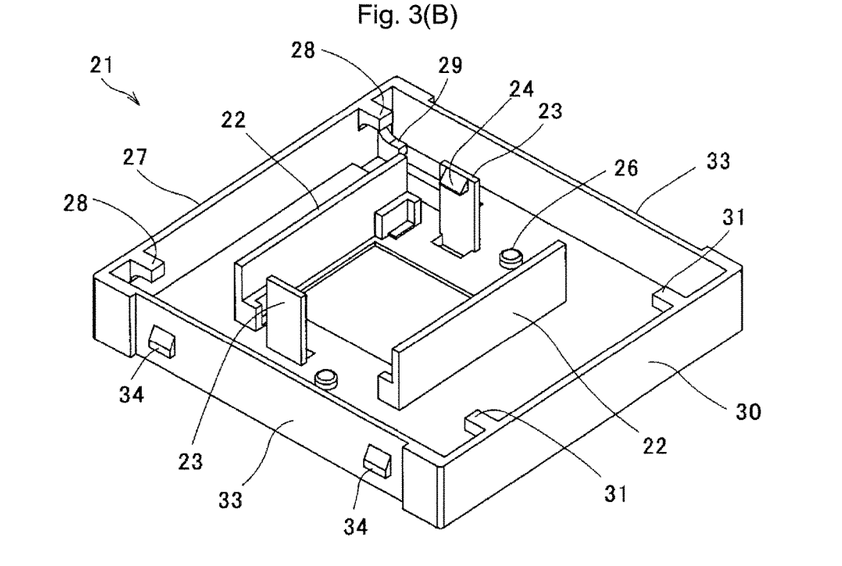
FIG. 3(B) is a perspective view of the base viewed in a direction different from that in FIG. 3(A).

As illustrated in FIGS. 3(A) and 3(B), base 21 has a box shape in which an upper portion is opened, and power-generating unit 11 is placed in base 21. Base 21 includes a pair of horizontally long first vertical walls 22 rising from a bottom surface, and a pair of vertically long second vertical walls 23. Power-generating unit 11 is placed between first vertical walls 22 and 22 and between second vertical walls 23 and 23. Power-generating unit 11 is retained by plate-like body 15 that is latched in latching pawl 24 provided at an upper end edge of second vertical wall 23. Columnar projection 26 projects from a portion near first vertical wall 22 and second vertical wall 23 in order to position return spring 17 (elastic body).

A pair of first upper projections 28 projecting inward is formed at an upper edge of first side wall 27 of base 21. A pair of first lower projections 29 projecting inward is formed on a lower side of first side wall 27 so as to correspond to first upper projections 28. First link 61 of drive section 60 is pinched between first upper projection 28 and first lower projection 29 so as to be turnable with respect to base 21.

A pair of second upper projections 31 projecting inward is formed at an upper end of second side wall 30 opposed to first side wall 27. A pair of second lower projections 32 projecting inward is formed on the lower side of second side wall 30 so as to correspond to second upper projections 31. Second link 71 of drive section 60 is pinched between second upper projection 31 and second lower projection 32 so as to be turnable with respect to base 21.

A pair of latching pawls 34 is formed in an outer surface of third side wall 33 that is adjacent to first side wall 27 and second side wall 30.

Figure 4:
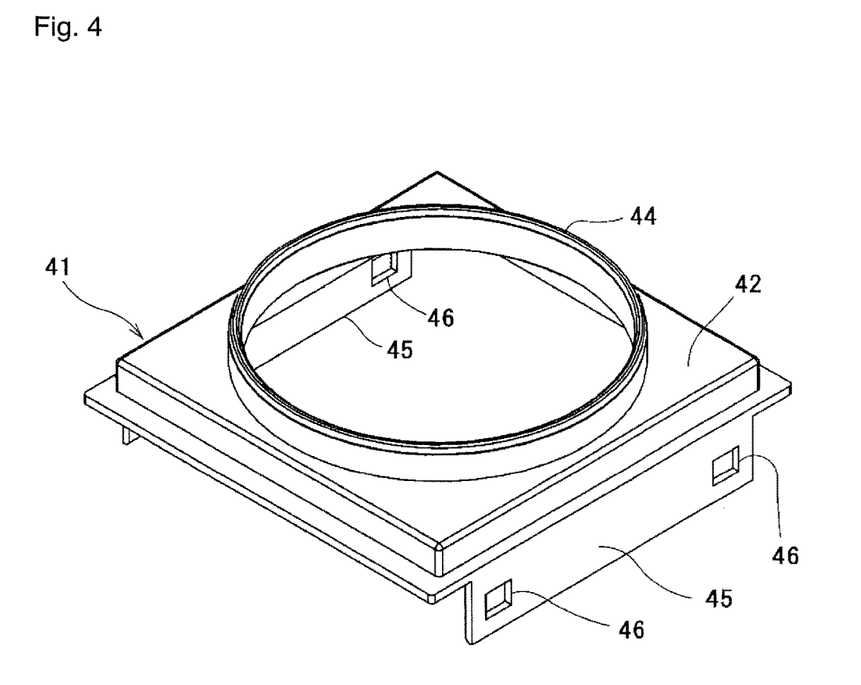
FIG. 4 is a perspective view illustrating a cover of the power-generating module in FIG. 2.

As illustrated in FIG. 4, cover 41 includes rectangular plate 42, circumferential wall 44, and rectangular side plates 45. Rectangular plate 42 has a planar shape covering an opening of base 21. Circumferential wall 44 forms a circular hole while projecting from an upper surface of rectangular plate 42. Rectangular side plates 45 extend downward from both side edge portions of rectangular plate 42, both the side edge portions being opposed to each other. A pair of windows 46 provided in side plate 45 is latched in latching pawls 34 formed in third side wall 33 of base 21, thereby fixing cover 41 to base 21.

Figure 5A:
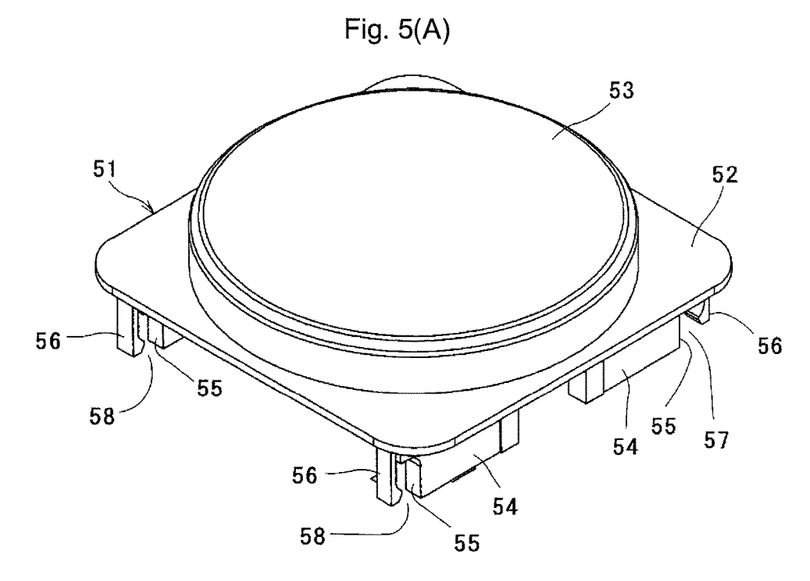
FIG. 5(A) is a perspective view illustrating a plunger of the power-generating module in FIG. 2 when viewed from above.
Figure 5B:
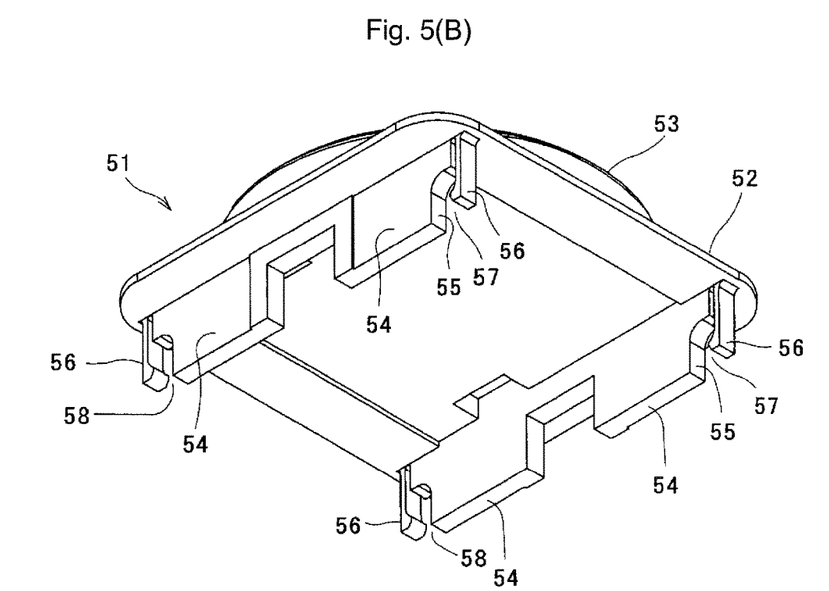
FIG. 5(B) is a perspective view of the plunger viewed from below.

Plunger 51 is provided between base 21 and cover 41. As illustrated in FIGS. 5(A) and 5(B), plunger 51 includes rectangular board 52, circular pressing part 53, and rectangular guide plates 54. Circular pressing part 53 bulges upward from board 52. Rectangular guide plates 54 extend downward from both side edge portions of board 52, both the side edge portions being opposed to each other. Notches 55 are formed at outer ends of guide plates 54. Ribs 56 extend downward from a lower surface of board 52 so as to be opposed to notches 55. Ribs 56 and notches 55 constitute first bearings 57 or second bearings 58 located at edges on the side opposite to first bearings 57 of board 52. First bearings 57 are fitted in first narrow necks 70 of first link 61 described later. Second bearings 58 are fitted in second narrow necks 76 of second link 71 described later. First bearings 57 and second bearings 58 are provided at corners in the lower surface of board 52. By such a configuration, any portion of pressing part 53 may be pressed to cause a pressing force to securely and evenly be transmitted to power-generating unit 11 through drive section 60 to improve operability and reliability.

As illustrated in FIG. 2, drive section 60 is constructed with first link 61 and second link 71. First link 61 and second link 71 are normally biased upward by return spring 17. When pressing part 53 is pressed to move downward, plunger 51 moves downward in conjunction with pressing part 53 to downwardly press start-up tongue piece 12 of power-generating unit 11.

Figure 6A:
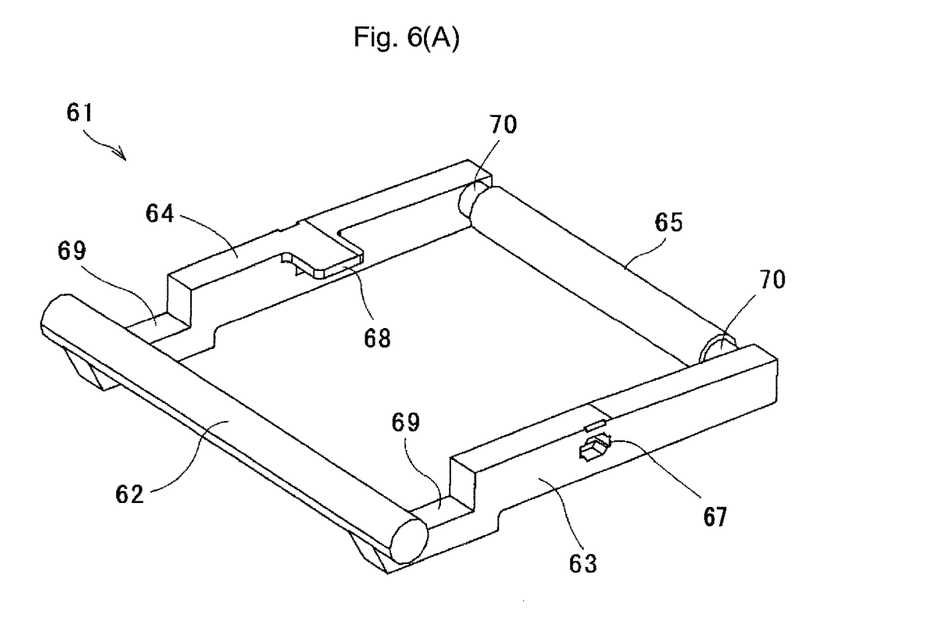
FIG. 6(A) is a perspective view illustrating a first link of the power-generating module in FIG. 2.
Figure 6B:
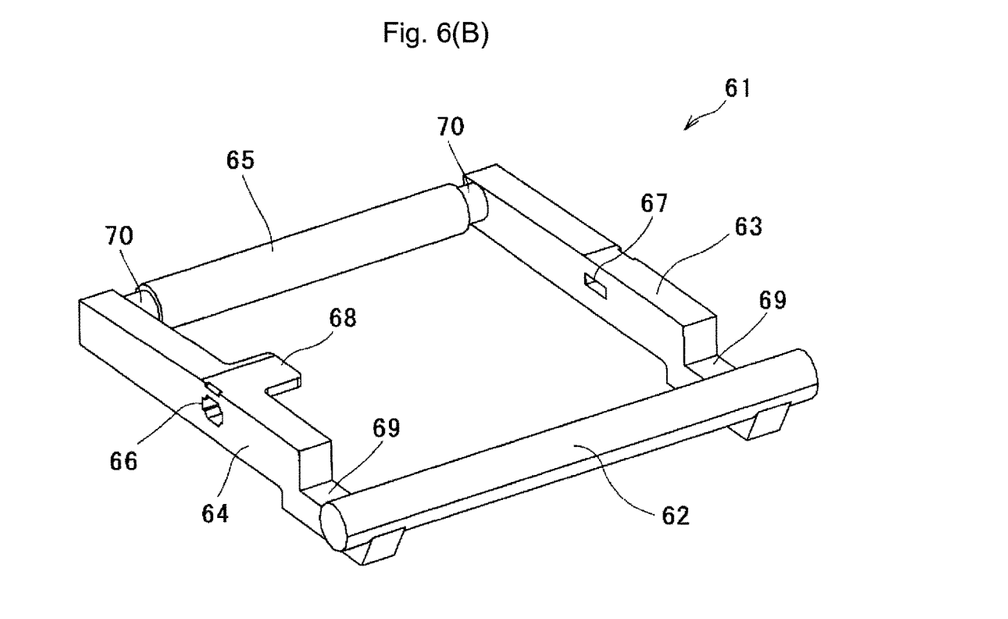
FIG. 6(B) is a perspective view of the first link viewed in a direction different from that in FIG. 6(A).

First link 61 is a square frame body as illustrated in FIGS. 6(A) and 6(B). First link 61 includes a pair of first arms 63 and 64, first shaft (turning shaft) 62, and first movable part 65. Ends of first arms 63 and 64 are bridged by first shaft 62, and the other ends of first arms 63 and 64 are bridged by first movable part 65.

First arms 63 and 64 are linearly formed. First arm 63 includes rectangular operation hole (operating portion) 67 inside the center thereof. Start-up tongue piece 12 of power-generating unit 11 is inserted in operation hole 67. Substantially elliptical first fitting hole 66 is made at an edge of an outer opening of operation hole 67, and second circular projection 75 of second link 71 described later can be fitted in first fitting hole 66. When operation hole 67 is made in first fitting hole 66, power-generating unit 11 can securely be started up by displacement of first and second links 61 and 71 interlocking with plunger 51. In the first embodiment, first fitting hole 66 is coupled to operation hole 67. Alternatively, for example, operation hole 67 may be arranged in coaxial with or near first fitting hole 66. Operation hole 67 may be constructed with a projection that pinches start-up tongue piece 12.

On the other hand, substantially elliptical first fitting hole 66 is made on the outside in the center of first arm 64, and second circular projection 75 of second link 71 described later is fitted in first fitting hole 66. Biasing plate 68 projects inward at the upper end in the center of first arm 64. First link 61 is biased upward by return spring 17 that is compressively arranged between biasing plate 68 and columnar projection 26 of base 21. Downwardly-recessed steps 69 are provided to first arms 63 and 64 on the side of first shaft 62.

First shaft 62 having a columnar shape couples the one end of first arm 63 to the one end of first arm 64. First shaft 62 is turnably sandwiched between first upper projections 28 and first lower projections 29 of base 21. Therefore, first link 61 turns about first shaft 62.

First movable part 65 having the columnar shape couples the other end of first arm 63 to the other end of first arm 64. First narrow necks 70 are formed on both sides of first movable part 65. First narrow necks 70 are connected to the ends of first arms 63 and 64, and have a diameter smaller than that of first movable part 65. First narrow necks 70 are fitted in first bearings 57 of plunger 51. The ends of first arms 63 and 64 are coupled to one another by first shaft 62 and first movable part 65, which allows strength of first link 61 to be ensured.

Figure 7A:
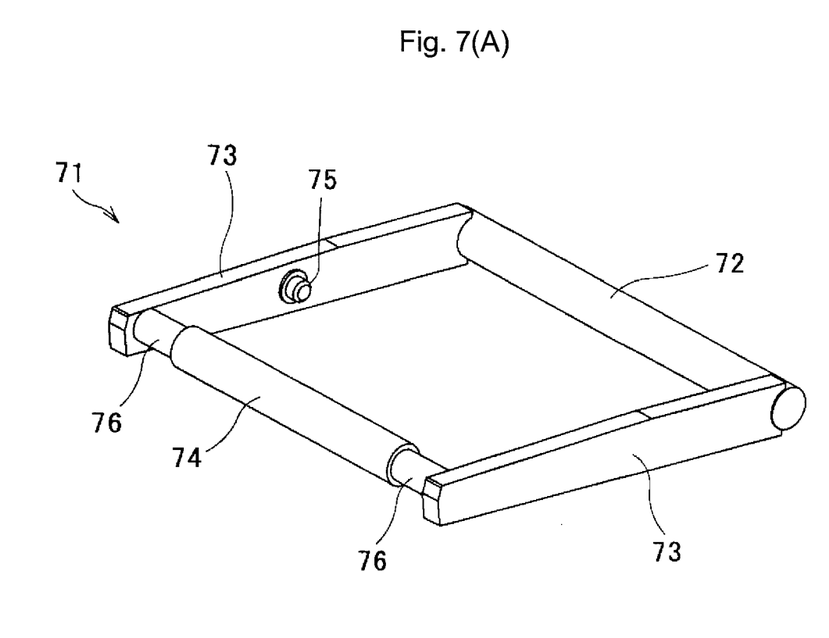
FIG. 7(A) is a perspective view illustrating a second link of the power-generating module in FIG. 2.
Figure 7B:
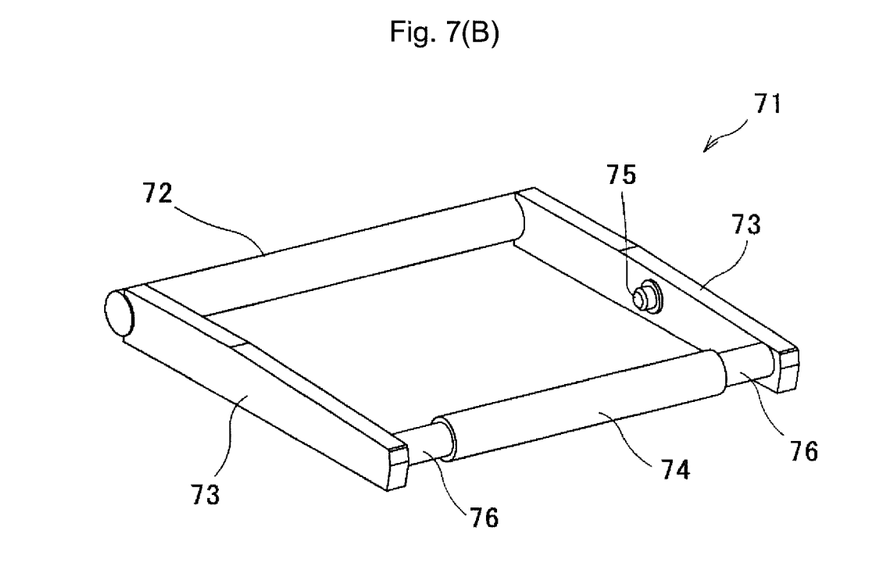
FIG. 7(B) is a perspective view of the second link viewed in a direction different from that in FIG. 7(A).

Second link 71 is a square frame body as illustrated in FIGS. 7(A) and 7(B). Second link 71 includes a pair of second arms 73 and 73, second shaft (turning shaft) 72, and second movable part 74. Ends of second arms 73 and 73 are bridged by second shaft 72, and the other ends of second arms 73 and 73 are bridged by second movable part 74.

Second arms 73 are linearly formed. Inwardly projecting second circular projections 75 are formed in the centers of the inner surfaces of second arms 73. Second circular projections 75 are turnably fitted in first fitting holes 66.

Second shaft 72 having a columnar shape couples the one end of second arm 73 to the one end of second arm 73. Second shaft 72 is turnably sandwiched between second upper projection 31 and second lower projection 32 of base 21. Therefore, second link 71 turns about second shaft 72.

Second movable part 74 having a columnar shape couples the other end of second arm 73 to the other end of second arm 73. Second narrow necks 76 are formed on both sides of second movable part 74. Second narrow necks 76 are connected to the ends of second arms 73 and 73, and have a diameter smaller than that of second movable part 74. Second narrow necks 76 are fitted in second bearings 58 of plunger 51. The ends of second arms 73 and 73 are coupled to one another by second shaft 72 and second movable part 74, which allows the strength of second link 71 to be ensured.

Assembly of power-generating module 1 having the above configuration will be described below.

In order to assemble power-generating module 1, power-generating unit 11 in which start-up tongue piece 12 is located at an off position is placed between first vertical wall 22 and second vertical wall 23 of base 21. Power-generating unit 11 is latched in latching pawl 24 of second vertical wall 23 with plate-like body 15 interposed therebetween, thereby retaining power-generating unit 11. Return spring 17 is fitted in columnar projection 26, thereby positioning return spring 17.

Figure 8:
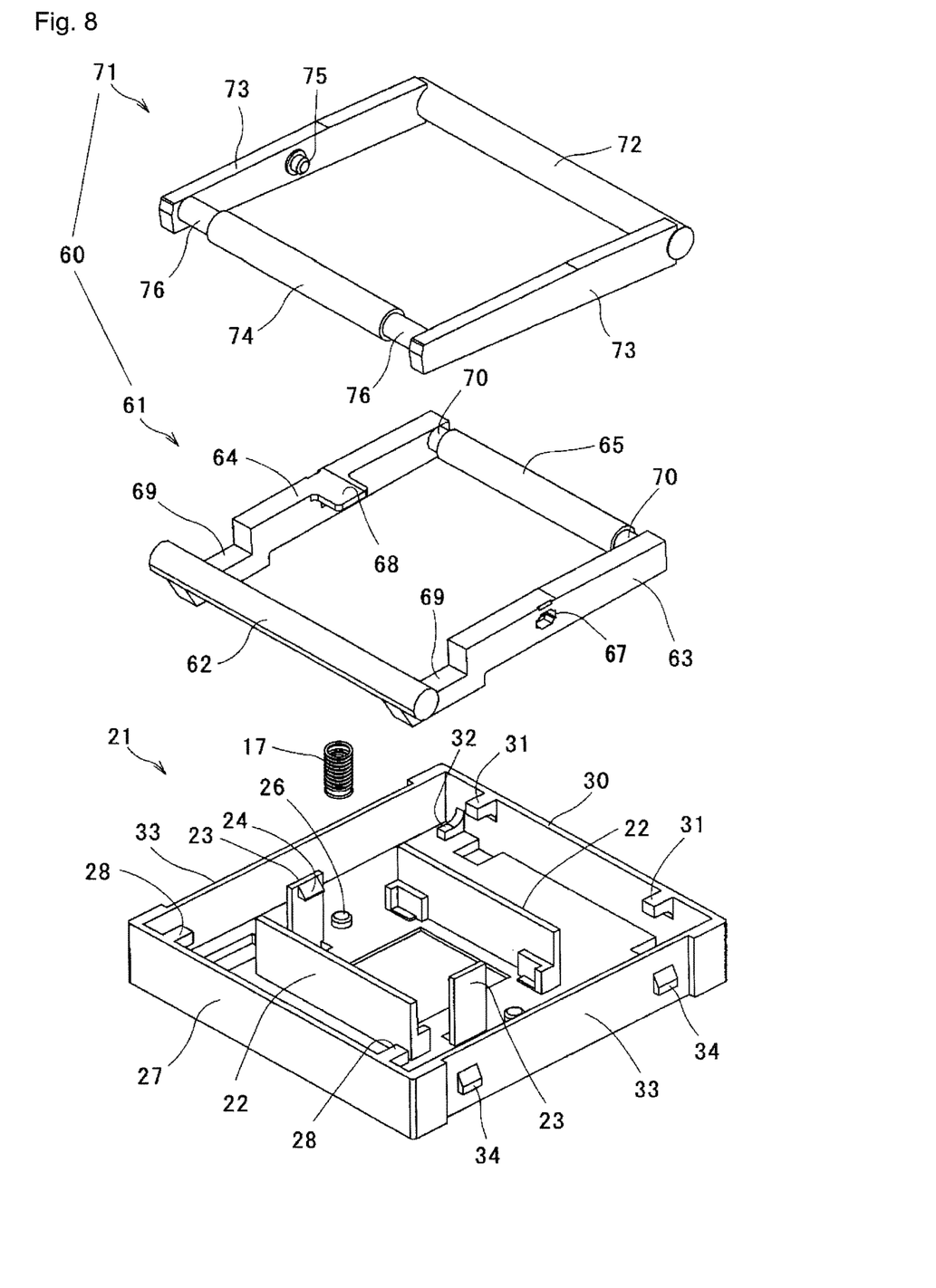
FIG. 8 is an exploded perspective view illustrating the base, the first link, and the second link.

Second circular projection 75 of second link 71 is fitted in first fitting hole 66 of the first link 61 to assemble drive section 60. Start-up tongue piece 12 of power-generating unit 11 is inserted in operation hole 67 of first link 61. First shaft 62 of first link 61 is assembled between first upper projection 28 and first lower projection 29 of base 21, whereby first link 61 is provided so as to be turnable about first shaft 62 with respect to base 21. Similarly, second shaft 72 of second link 71 is assembled between second upper projection 31 and second lower projection 32 of base 21, whereby second link 71 is provided so as to be turnable about second shaft 72 with respect to base 21.

Then plunger 51 is placed in base 21 such that guide plates 54 are located inside first arms 63 and 64. At this point, first bearings 57 of plunger 51 are fitted in first narrow necks 70 of first link 61 while second bearings 58 are fitted in second narrow necks 76 of second link 71.

Finally, cover 41 is put over plunger 51 from above such that the inner circumference of circumferential wall 44 provided in cover 41 is matched with the outer circumference of pressing part 53 provided in plunger 51. Windows 46 of side plate 45 are latched in latching pawls 34 of base 21 to complete the assembly of power-generating module 1. At this point, first link 61 and second link 71 are biased upward by return spring 17 compressed between biasing plate 68 and base 21, and first link 61 and second link 71 are located at a boost-up position in FIG. 9(A).

Figure 9A:
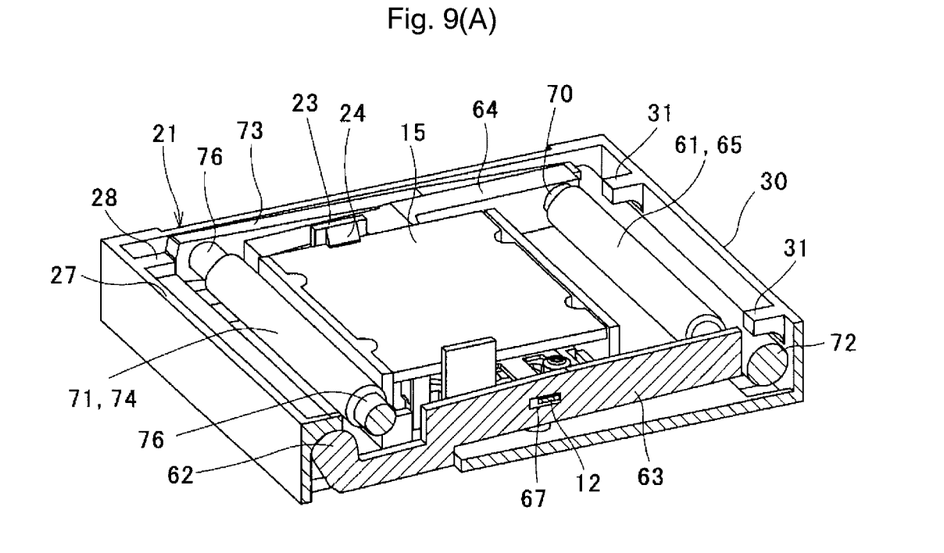
FIG. 9(A) is a perspective view illustrating an assembly of the base, the first link, and the second link before operation.
Figure 9B:
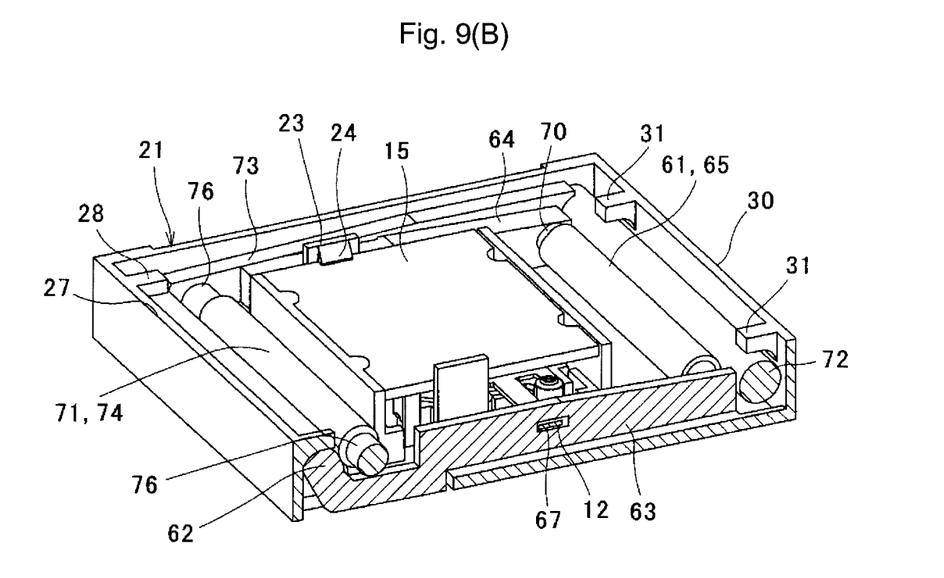
FIG. 9(B) is a partially enlarged perspective view illustrating the assembly after the operation.

When a user presses down pressing part 53 to use power-generating module 1, plunger 51 moves downward in base 21 while being guided by guide plates 54. At this point, first bearings 57 downwardly press first narrow necks 70 of first link 61 while second bearings 58 downwardly press second narrow necks 76 of second link 71. Therefore, first link 61 turns downward about first shaft 62 while second link 71 turns downward about second shaft 72. That is, first link 61 and second link 71 turn by way of fitting portions 66 and 75 while interlocking with each other, whereby first link 61 and second link 71 turn from the boost-up position to a press-in position shown in FIG. 9(B). Therefore, operation hole 67 of first link 61 downwardly presses start-up tongue piece 12 of power-generating unit 11 to turn on power-generating unit 11. The pressing force acting on plunger 51 is evenly transmitted to power-generating unit 11 through two links 61 and 71 to turn on power-generating unit 11. Accordingly, the configuration of power-generating module 1 can be simplified to reduce production cost. First link 61 and second link 71 interlock with each other by way of while fitting portions 66 and 75, and therefore, when one of first and second links 61 and 71 is pressed in, the other of first and second links 61 and 71 is also pressed in. In this manner, a variation in touch-operation feeling can be eliminated to improve operability and reliability.

Figure 10A:
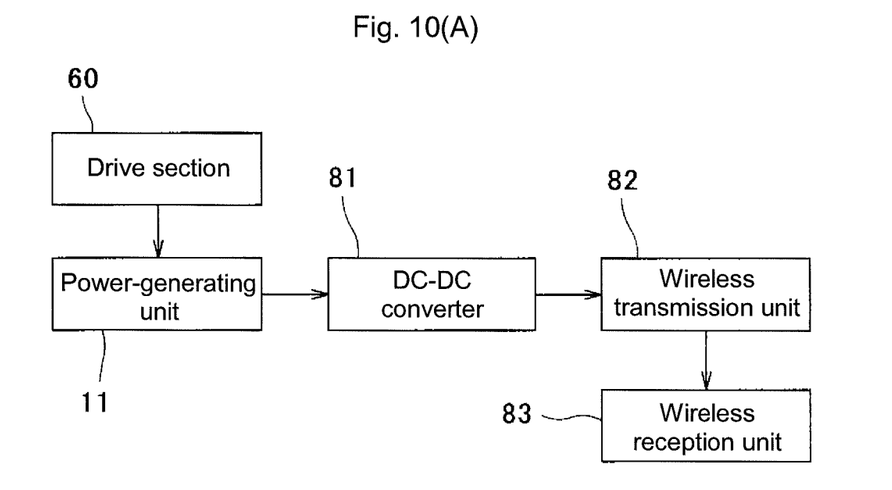
FIG. 10(A) is a block diagram illustrating an electronic device including the power-generating module and a wireless unit.

As illustrated in FIG. 10(A), when power-generating unit 11 is turned on by drive section 60, for example, the power generated by the electromagnetic induction is converted into a desired voltage value by DC-DC converter 81. In this manner, wireless transmission unit 82 is started up. A wireless electric signal generated according to the start-up is transmitted from wireless transmission unit 82 to wireless reception unit 83. Therefore, an electronic device in which wireless reception unit 83 senses the press of pressing part 53 provided in plunger 51 of power-generating module 1 can be constructed.

Figure 10B:
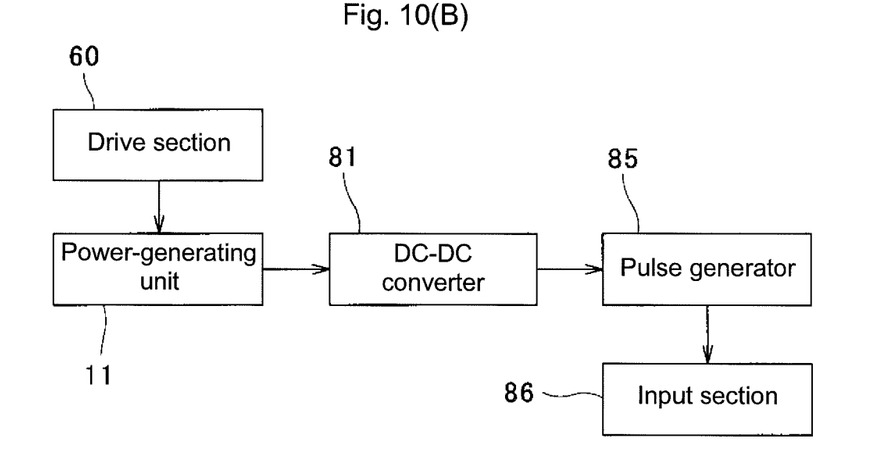
FIGS. 10(B) and 10(C) are block diagrams illustrating wired type electronic devices including the power-generating modules.
Figure 10C:
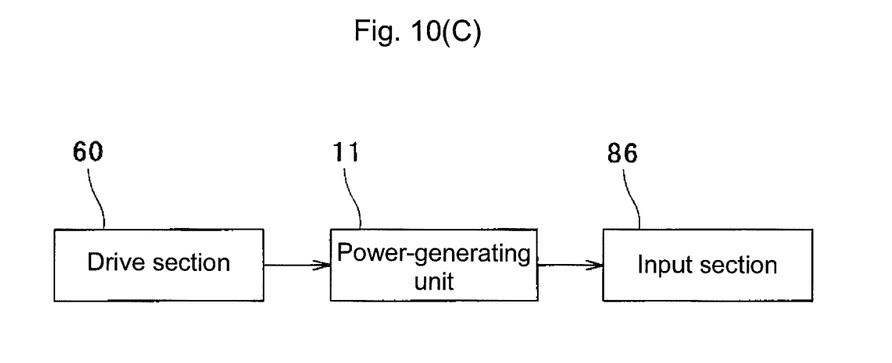

The wireless unit is used in the first embodiment. Alternatively, a wired system may be used. In this case, as illustrated in FIG. 10(B), the power having a voltage value converted by DC-DC converter 81 starts up pulse generator 85. The electric signal generated by pulse generator 85 is transmitted to input section 86 in order to input the signal to an external device such as a sequencer, so that the press of pressing part 53 is sensed by way of input section 86.

In the case that the wired system is used, DC-DC converter 81 and pulse generator 85 may be eliminated from FIG. 10(B). At the same time, the power generated by driving power-generating unit 11 may directly be transmitted as the electric signal to input section 86 (see FIG. 10(C)). Therefore, the electronic device that senses the press of pressing part 53 can be constructed with a simple configuration.

Figure 11:
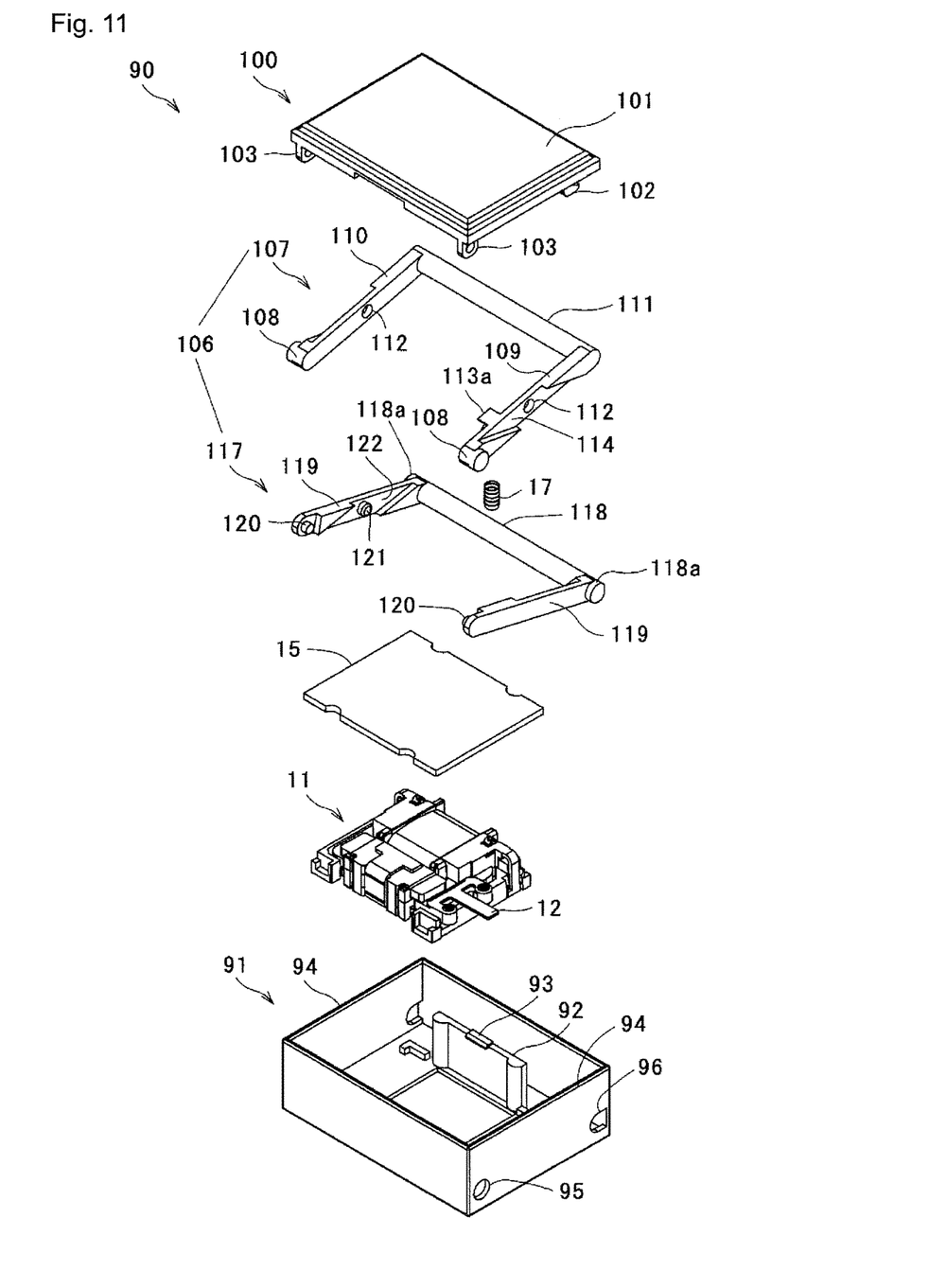
FIG. 11 is an exploded perspective view illustrating a power-generating module according to a second embodiment of the present invention when viewed from above.
Figure 12:
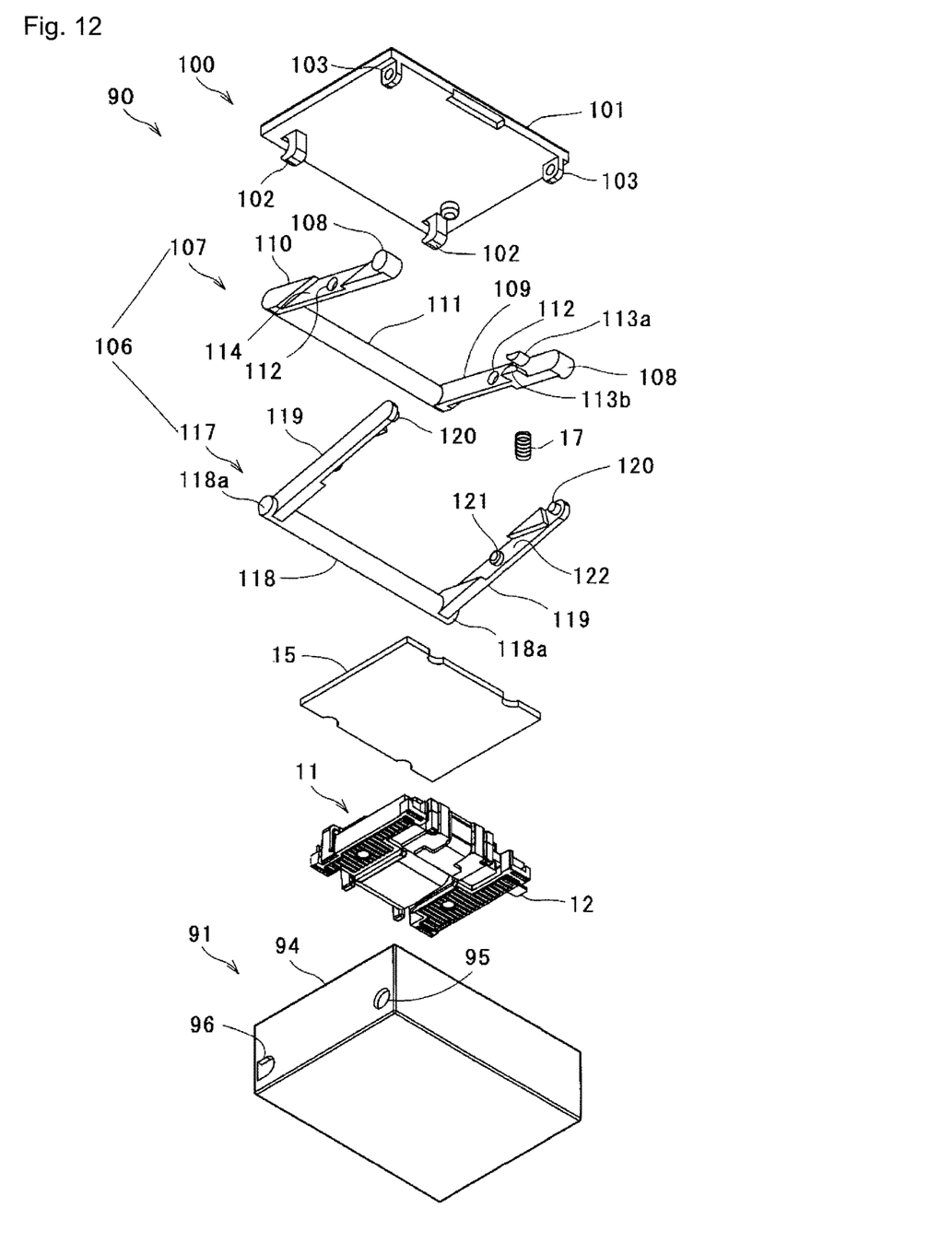
FIG. 12 is an exploded perspective view illustrating the power-generating module in FIG. 11 when viewed from below.

In a second embodiment, as illustrated in FIGS. 11 and 12, power-generating module 90 includes power-generating unit 11, base 91, plunger 100, and drive section 106. Plunger 100 is arranged while being vertically movable, and drive section 106 drives power-generating unit 11 according to movement of plunger 100.

Base 91 has a box shape in which the upper portion is opened, and power-generating unit 11 is placed in base 91. Base 91 includes a pair of horizontally long support walls 92 rising from the bottom surface. Power-generating unit 11 is placed between support walls 92 and 92, and retained by latching pawl 93 provided at the upper end edge of support wall 92 with plate-like body 15 interposed therebetween. Circular holes 95 in which first link 107 described later is fitted and semi-circular holes 96 in which second link 117 is fitted are made in side walls 94 of base 91 opposed to each other.

Plunger 100 includes pressing part 101, a pair of first bearings 102, and a pair of second bearings 103. Pressing part 101 has a rectangular shape in planar view. The pair of first bearings 102 extends downward from pressing part 101 to engage with first movable part 111 of first link 107 described later. The pair of second bearings 103 is formed by circular holes in which second movable parts 120 of second link 117 are fitted.

Drive section 106 is constructed with first link 107 and second link 117. First link 107 and second link 117 are normally biased upward by return spring 17. When pressing part 101 is pressed to move downward, plunger 100 moves downward in conjunction with pressing part 101 to downwardly press start-up tongue piece 12 of power-generating unit 11.

First link 107 is a U-shape frame body. First link 107 includes a pair of first arms 109 and 110, columnar first shafts 108 that are coaxially provided at ends of first arms 109 and 110, and columnar first movable part 111 that couples the other ends of first arms 109 and 110 to each other.

First fitting holes 112 in which second circular projections 121 of second link 117 are fitted are made in the centers of first arms 109 and 110. A vertically arranged pair of semi-columnar operating portions 113a and 113b projecting inward is provided in first arm 109 (see FIG. 12). First link 107 is biased upward by return spring 17 that is compressively arranged between lower-side operating portion 113b and base 91. Inwardly-recessed steps 114 are provided on the outer surfaces of first arms 109 and 110. First shafts 108 are fitted in circular holes 95 of base 91, whereby first link 107 turns about first shafts 108.

Second link 117 is a U-shape frame body. Second link 117 includes a pair of second arms 119 and 119, columnar second shaft 118, and second movable parts 120. Columnar second shaft 118 couples ends of second arms 119 and 119 to each other, and second movable parts 120 are provided in inward surfaces at the other ends of second arms 119 and 119.

Second circular projections 121 are formed in the centers of second arms 119. Second circular projections 121 project inward, and are fitted in first fitting holes 112 of first link 107. Inwardly-recessed steps 122 are formed in second arms 119. Both ends 118a and 118a of second shaft 118 are fitted in semi-circular holes 96 of base 91, whereby second link 117 turns about second shaft 118. Second movable parts 120 are constructed with circular ribs that are coaxially provided while projecting inward.

Thus, power-generating module 90 is driven by the simple configuration of first link 107 and second link 117, so that the number of components constituting power-generating module 90 can be decreased to reduce the production cost.

Assembly of power-generating module 90 having the above configuration will be described below.

In order to assemble power-generating module 90, power-generating unit 11 in which start-up tongue piece 12 is located at the off position is placed between support walls 92 and 92 of base 91. Plate-like body 15 is latched in latching pawl 93 to retain power-generating unit 11.

Second circular projections 121 of second link 119 are fitted in first fitting holes 112 of first arms 109 and 110. Start-up tongue piece 12 of power-generating unit 11 is pinched between operating portions 113a and 113b. First shafts 108 are fitted in circular holes 95 of base 91, and the both ends of second shaft 118 are fitted in semi-circular holes 96. Return spring 17 is compressively pinched and positioned between lower-side operating portion 113b and a bottom plate of base 91. First link 107 and second link 117 are biased upward and inclined by return spring 17, and located at a boost-up position.

Plunger 100 is put over the opening of base 91 to fit first bearings 102 in first movable part 111 of first link 107, and second bearings 103 are fitted in second movable parts 120 of second link 117 to complete the assembly.

When a user presses downwardly presses pressing part 101 to use power-generating module 90, plunger 100 moves downward. In this manner, first bearings 102 downwardly press first movable part 111 of first link 107 while second bearings 103 downwardly press second movable part 120 of second link 117. Therefore, first link 107 turns about first shafts 108 while second link 117 turns about second shaft 118. As a result, first link 107 and second link 117 turn. Consequently, operating portion 113a of first link 107 downwardly presses start-up tongue piece 12 of power-generating unit 11 to turn on power-generating unit 11.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1 power-generating module
17 return spring (elastic body)
21 base
51 plunger
53 pressing part
60 drive section
61 first link
62 first shaft (turning shaft)
63, 64 first arm
65 first movable part
66 first fitting hole (fitting portion)
67 operation hole (operating portion)
71 second link
72 second shaft (turning shaft)
73 second arm
74 second movable part
75 second circular projection (fitting portion)
82 wireless transmission unit
83 wireless reception unit
86 input section
90 power-generating module
91 base
100 plunger
106 drive section
107 first link
108 first shaft (turning shaft)
109, 110 first arm
111 first movable part
112 first fitting hole (fitting portion)
113a, 113b operating portion
117 second link
118 second shaft (turning shaft)
119 second arm
120 second movable part
121 second circular projection (fitting portion)

The invention claimed is:

1. A power-generating module comprising:
a base;
a power-generating unit that is placed in the base;
a plunger that is placed in the base and that vertically reciprocates; and
a drive section that interlocks with the reciprocation of the plunger and starts up the power-generating unit,
wherein the drive section is biased to a boost-up position where the plunger is boosted up,
wherein the drive section comprises at least two links that turn between the boost-up position and a press-in position where the power-generating unit is started up,
wherein both ends of one of the links are turnably supported by the base,
wherein both ends of another link are turnably supported by the plunger, and
wherein the links turn in an interlocking manner by coupling to each other.

2. The power-generating module according to claim 1, wherein the drive section is turnably supported by the plunger.

3. The power-generating module according to claim 1,
wherein the drive section is biased to the boost-up position by an elastic body, and
wherein an operating portion that starts up the power-generating unit is provided in an arm having an intersection at a fitting portion that couples the links to each other.

4. The power-generating module according to claim 3, wherein the operating portion is provided in coaxial with or near the fitting portion.

5. The power-generating module according to claim 1,
wherein the links comprise a first link and a second link,
wherein each of the first link and the second link comprises:
a pair of arms,
a turning shaft that couples ends of the arms to each other, and
a movable part that couples other ends of the arms to each other and turn about the turning shaft, and
wherein the arms of the first link fit in and intersect the respective arms of the second link in centers of the arms.

6. The power-generating module according to claim 1,
wherein the links comprise a first link and a second link,
wherein the first link comprises:
a pair of arms,
a turning shaft provided at ends of the arms, and
a movable part that couples other ends of the arms to each other and turn about the turning shaft,
wherein the second link comprises:
a pair of arms,
a turning shaft that couples ends of the arms to each other, and
a movable part that is provided at other ends of the arms and that turns about the turning shaft, and
wherein the arms of the first link fit in and intersect the respective arms of the second link in centers of the arms.

7. An electronic device,
wherein a wireless transmission unit is started up by a power generated by the power-generating module according to claim 1, and
a signal transmitted from the wireless transmission unit is received by a wireless reception unit to sense press of a pressing part provided in the plunger.

8. An electronic device,
wherein a pulse generator is started up by a power generated by the power-generating module according to claim 1, and
wherein press of a pressing part provided in the plunger is sensed by reception of a signal transmitted from the pulse generator, the reception by an input section that inputs the signal to an external device.

9. An electronic device,
wherein press of a pressing part provided in the plunger is sensed by reception of a signal transmitted from the power-generating module according to claim 1, and wherein the reception by an input section inputs the signal to an external device.

\* \* \* \* \*